United States Patent [19]

Davis

[11] 4,087,109

[45] May 2, 1978

[54] MOTORCYCLE FRAME AND SUSPENSION AND METHODS OF MAKING AND USING THE SAME

[76] Inventor: William F. Davis, 6234 Langdon Ct., Berkeley, Mo. 63134

[21] Appl. No.: 770,648

[22] Filed: Feb. 22, 1977

Related U.S. Application Data

[63] Continuation-in-part of Ser. No. 666,669, Mar. 15, 1976, Pat. No. 4,022,484.

[51] Int. Cl.² ............................................. B62K 25/10
[52] U.S. Cl. ................................................. 280/284
[58] Field of Search ................... 280/281, 284; 180/32, 180/35

[56] References Cited

U.S. PATENT DOCUMENTS

| | | | |
|---|---|---|---|
| 468,643 | 2/1892 | Clement | 280/284 X |
| 1,266,800 | 5/1918 | Harley | 280/284 |
| 1,272,399 | 7/1918 | Douglas | 280/284 |
| 1,576,216 | 3/1926 | Phillips | 280/284 |
| 3,877,539 | 4/1975 | Tilkens | 180/32 |
| 4,022,484 | 5/1977 | Davis | 280/284 |

FOREIGN PATENT DOCUMENTS

| | | | |
|---|---|---|---|
| 998,215 | 1/1952 | France | 280/284 |
| 445,464 | 2/1949 | Italy | 280/284 |
| 457,250 | 5/1950 | Italy | 280/284 |
| 446,263 | 3/1949 | Italy | 280/284 |
| 22,488 of | 1911 | United Kingdom | 280/284 |

Primary Examiner—Joseph F. Peters, Jr.
Assistant Examiner—Terrance L. Siemens

[57] ABSTRACT

A motorcycle frame and rear wheel suspension comprising a main frame in combination with a pivotally mounted and shock mounted rear frame and transition frame.

1 Claim, 5 Drawing Figures

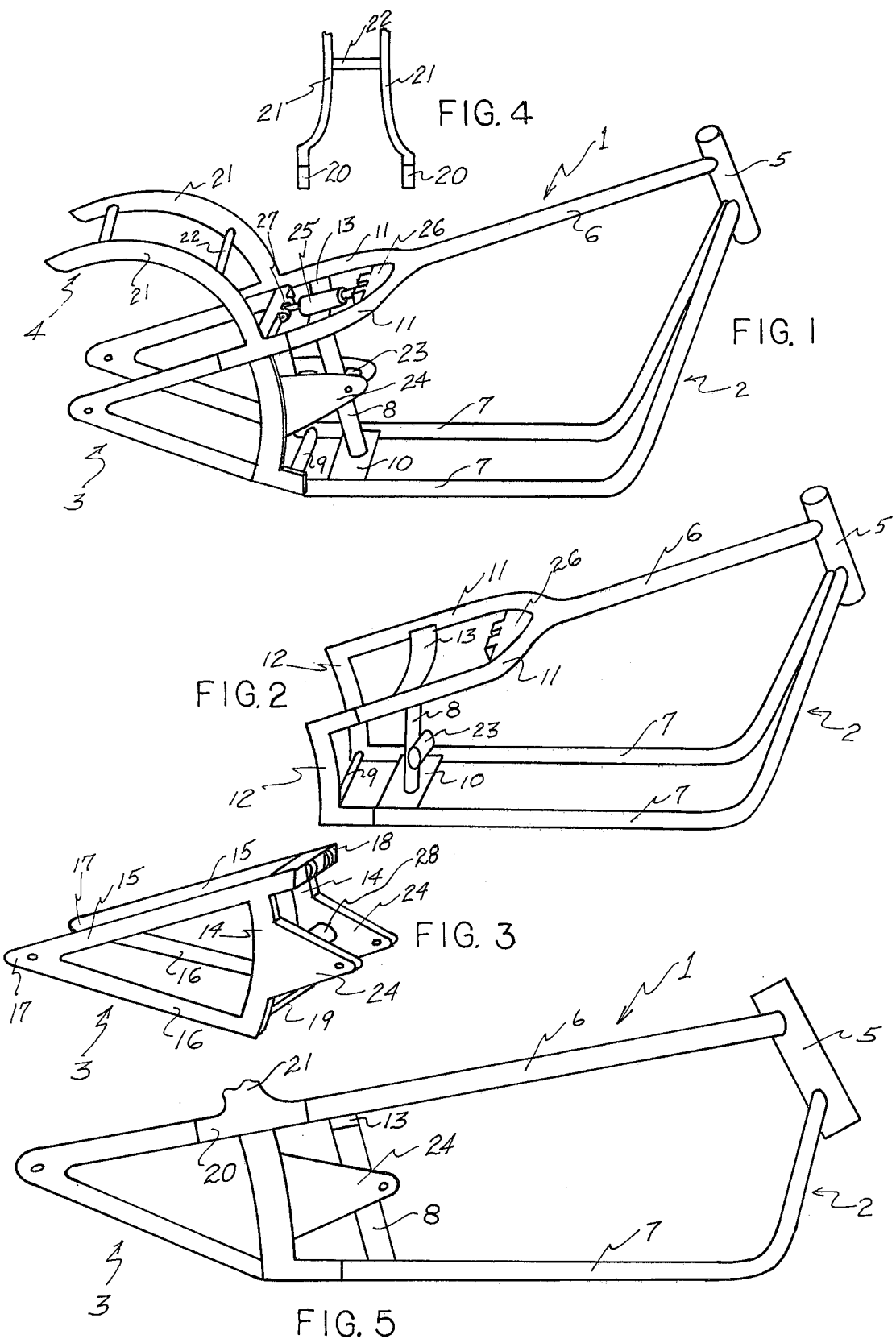

MOTORCYCLE FRAME AND SUSPENSION AND METHODS OF MAKING AND USING THE SAME

This application is a continuation-in-part of application No. 666,669 filed Mar. 15, 1976, now U.S. Pat. No. 4,022,484.

BACKGROUND OF THE INVENTION

Early motorcycle frames were constructed in rigid fashion in a shape which provided an essentially vertical structure in the front and longitudinal frame structure which extended from the upper and lower part of the vertical structure to a point of convergence at the axle of the rear wheel.

The rigid frame provided a rough and unsafe ride and considerable effort has been extended to provide a suspension means for the rear wheel which would increase the comfort and safety of the motorcycle.

Devices prior to applicant's device have consisted primarily of modifying the main frame such that the longitudinal frame structure is terminated in the seat area and instead of continuing on to the rear axle, are connected by a second vertical structure to provide a rigid main frame. Added to the main frame is a fork structure to support the rear wheel. The fork structure is essentially in the shape of a tuning fork with the open end to the rear, supporting the rear axle and wheel. The closed end of the "tuning fork" is pivotally mounted to the second vertical structure. With this configuration various springs and shock absorbers have been inserted between the tuning fork and main frame to provide a spring mounted rear wheel. Disadvantages and limitations inherent in these solutions to the problem included the fact that the frame configuration was altered and the streamlined appearance of the original frame was lost, the integrity of the rear structure was not satisfactory, the present systems tend to be subject to unbalance in their suspension, and the spring or shock absorber means are exposed external to the frame.

SUMMARY OF THE INVENTION

In the present invention a device is contemplated which in addition to the second vertical structure provides a contoured structure which is adapted to match the contour of and accept a suitable rear frame. The rear frame is contoured to match the contoured structure and is pivotally mounted thereto. The shock absorber and springs are suspended from the upper-most portion of the rear frame to the second vertical structure of the main frame or near its joinder with upper longitudinal members of the main frame.

The rear frame is provided with longitudinal structure which converges to the axle for the rear wheel.

An additional feature is the transition structure which is mounted on the main frame and is provided with a member which extends in alignment with the upper longitudinal structures of the main frame and rear frame and is provided with mounting structure for the rear fender and seat.

It is a primary object of the invention to provide such a device constructed in a fashion which lends itself to economical manufacturing.

A further object of the present invention is to provide such a device which maintains the streamlined configuration of the early rigid frames.

A further object of the present invention is to provide such a device which provides a rear structure of sufficient integrity to conform to today's safety standards.

A further object of the present invention is to provide such a device which provides a balanced rear suspension which minimizes tilting of the rear wheel, encloses the spring and damper means.

A further object of the present invention is to provide such a device which provides greater rear wheel travel of the rear frame without surrendering safety.

A further object of the present invention is to provide such a device which provides a cantilevered seat assembly.

With the above primary and other incidental objects in view, which will appear more fully in the specification of the invention which is provided herein, the invention to be protected by Letters Patent consists of the features of construction, the parts and combinations thereof, and the mode of operation hereinafter described or illustrated in the accompanying drawings or their equivalents.

BRIEF DESCRIPTION OF THE DRAWINGS

Referring to the drawings wherein is illustrated a preferred but not necessarily only form of embodiment of the invention.

FIG. 1 is a perspective view of a motorcycle frame and suspension constructed in accordance with and embodying the present invention.

FIG. 2 is a perspective view of the main frame of the device shown in FIG. 1.

FIG. 3 is a perspective view of the rear frame of the device shown in FIG. 1.

FIG. 4 is a partial elevation view of the transition frame used in the device shown in FIG. 1.

FIG. 5 is a partial elevation view of the device shown in FIG. 1.

DETAILED DESCRIPTION OF THE INVENTION

Referring now to the drawings in more detail and in particular to FIG. 1 the motorcycle frame, 1, is shown to comprise primarily, main frame, 2, rear frame, 3, and transition structure, 4.

Main frame, 2, as shown in FIGS. 1, 2, and 5, comprises the first vertical member, 5, to which is attached main upper longitudinal member, 6, and lower longitudinal members, 7, which extend rearwardly and are connected together by second vertical member, 8, and cross members, 9, 10. Secondary longitudinal members, 11, extend from members, 6, and, 8, to main contoured members, 12. Support member, 13, is disposed and mounted to and between members, 11.

Rear frame, 3, is seen in FIGS. 1, 3, and, 5, to comprise rear contoured members, 14, to which are attached rear upper longitudinal members, 15, and rear lower longitudinal members, 16, which converge at rear axle area, 17, and cross members, 18, and, 19.

Transitional structure, 4, as shown in FIGS. 1, 4, and, 5, is seen to comprise longitudinal portion, 20, which are secured to secondary longitudinal members, 11, and fender portions, 21, and supporting members, 22.

Rear frame, 3, is seen to pivotally attach to main frame, 2, where shaft and bearing, 23, couples the two frames and extends through flanges, 24, on the rear frame.

Damper, 25, which consists of one or more conventional spring and/or shock absorber means, is shown coupling the two frames in FIG. 1 and is connected to flanges, 26, on the main frame and flanges, 27, on the rear frame. Support member, 26, is mounted to and disposed between flanges, 24, on the rear frame.

The fender portion, 21, of transitional structure, 4, is shown in FIG. 4 to bow in slightly to allow space for mounting a fender and rear seat on structure, 4. The seat and fender are conventional and are not shown.

It is shown in the drawings that the rear frame is an integrated substantial structure pivotally mounted on shaft and bearing, 23, to the main frame with its motion damped by damper, 25, and still retains the streamlined appearance shown in FIG. 5.

While I have illustrated and described the preferred embodiments of my invention, it is to be understood that changes and modifications in the form, construction, arrangement and combination of the parts and steps of the motorcycle frame and suspension and methods of making and using the same may be substituted for those herein shown and described without departing from the nature and principle of my invention.

Having thus described my invention, what I claim as new and desire to secure by United States Letters Patent is:

1. A motorcycle frame comprising,
   a main frame, comprising a first vertical member, a plurality of longitudinal members attached to and extending rearwardly from said first vertical member, a second vertical member operably coupling said longitudinal members and a plurality of contoured rear vertical members disposed between said longitudinal members,
   a rear frame, comprising a plurality of longitudinal members coupled at one end thereof and a plurality of contoured vertical members disposed between said longitudinal members, said rear frame pivotally mounted to said main frame, and
   transitional structure means operably mounted on said main frame, and
   damping means operably connecting said main frame to said rear frame.

* * * * *

Disclaimer

4,087,109.—*William F. Davis,* Berkeley, Mo. MOTORCYCLE FRAME AND SUSPENSION AND METHODS OF MAKING AND USING THE SAME. Patent dated May 2, 1978. Disclaimer filed Feb. 27, 1981, by the inventor.

Hereby disclaims the remainder of the term of said patent.
[*Official Gazette April 28, 1981.*]